(12) United States Patent
Schaupensteiner

(10) Patent No.: US 7,661,745 B2
(45) Date of Patent: Feb. 16, 2010

(54) SUPPORTING DEVICE

(75) Inventor: Walter Schaupensteiner, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 8 days.

(21) Appl. No.: 12/260,104

(22) Filed: Oct. 29, 2008

(65) Prior Publication Data

US 2009/0108619 A1  Apr. 30, 2009

(30) Foreign Application Priority Data

Oct. 30, 2007  (DE)  ........................ 10 2007 051 708

(51) Int. Cl.
 *B62D 25/14* (2006.01)

(52) U.S. Cl. ........................................ 296/72

(58) Field of Classification Search .................. 296/72, 296/70; 180/90
See application file for complete search history.

(56) References Cited

U.S. PATENT DOCUMENTS

| 5,238,286 | A | * | 8/1993 | Tanaka et al. .................. 296/70 |
| 6,851,742 | B1 | | 2/2005 | Kubiak |
| 7,291,785 | B2 | | 11/2007 | Riester et al. |

FOREIGN PATENT DOCUMENTS

| DE | 10 2005 004 605 A1 | 8/2006 |
| EP | 0 842 805 B1 | 5/1998 |
| EP | 1 544 085 A2 | 6/2005 |

OTHER PUBLICATIONS

German Patent and Trademark Office Search Report, dated Jul. 7, 2008.

* cited by examiner

*Primary Examiner*—Lori L Lyjak

(57) ABSTRACT

A supporting device supports a cockpit, in particular a control panel, on a central tunnel of a motor vehicle. The supporting device has an X-shaped configuration with two arms which carry the cockpit and two legs which are supported on the central tunnel. The tendency of the cockpit to vibrate is minimized precisely because the central tunnel is connected to the cockpit by the X-shaped support.

18 Claims, 3 Drawing Sheets

SUPPORTING DEVICE

CROSS-REFERENCE TO RELATED APPLICATION

This application claims the priority, under 35 U.S.C. § 119, of German application DE 10 2007 051 708.6, filed Oct. 30, 2007; the prior application is herewith incorporated by reference in its entirety.

BACKGROUND OF THE INVENTION

Field of the Invention

The present invention relates to a supporting device for supporting a cockpit, in particular a control panel, on a central tunnel of a motor vehicle. In addition, the invention relates to a motor vehicle equipped with a supporting device of this type.

European patent EP 0 842 805 B1 discloses a supporting device which is of the type in question and contains a U-shaped holder with a multiplicity of holes on its side walls, which holes each receive a corresponding fastening screw. In this case, the U-shaped holder is disposed with its two U limbs on a housing of an auxiliary unit, i.e. is disposed indirectly there-above on a control panel, it rests with its web connecting the two U limbs on a central tunnel of the motor vehicle and is screwed thereto. The U-shaped holder therefore serves to support the control panel in relation to the central tunnel of the motor vehicle. The control panel needs to be supported here in order to avoid it sagging, as seen over the long term.

SUMMARY OF THE INVENTION

It is accordingly an object of the invention to provide a supporting device that overcomes the above-mentioned disadvantages of the prior art devices of this general type, which is capable first of reducing the tendency of the cockpit to vibrate during the driving mode of the motor vehicle and second to avoid sagging of the cockpit.

The invention is based on the general concept of providing a supporting device for supporting a cockpit on a central tunnel of a motor vehicle with an X-shaped configuration which has two arms which carry the cockpit and two legs which are supported in relation to the central tunnel. In comparison to a supporting device which is known from the prior art and which has a U-shaped configuration, the X-shaped configuration of the supporting device reduces the vibration amplitude by approximately 50 percent because the free vibrating length is halved. The tendency of the cockpit to vibrate is minimized precisely because the central tunnel is connected to the cockpit by the X-shaped support. The mass of the central tunnel serves indirectly as an absorbing device for the cockpit. To achieve the legal regulations with regard to head impact, the shape of the X-shaped support can easily/simply be varied. Furthermore, the vibration loading of the instruments arranged in the cockpit can be significantly reduced, as a result of which the instruments are subject to a significantly lower loading during the service life of the motor vehicle, and therefore their service life can be increased.

In an advantageous development of the solution according to the invention, the supporting device has flanges at least at the edges of the arms and/or of the legs. In this case, the flanges are configured as reinforcing webs and impart the desired rigidity to the supporting device depending on the configuration of the flanges. At the same time, flanges of this type can be used in order to connect the supporting device on the cockpit side and/or central tunnel side by, for example, passage openings for corresponding screws being provided on the flanges. In general, a significant increase in the rigidity of the supporting device can be achieved by the flanges provided according to the invention without significantly more material, which would lead to a significant increase in weight, having to be used for this purpose. At the same time, flanges of this type can be produced in a simple manner in terms of manufacturing in one production step, for example by a deforming process.

The supporting device is expediently formed from metal, in particular from light metal.

In a further advantageous embodiment of the solution according to the invention, the supporting device has at least one weight-reducing cutout. Weight-reducing cutouts of this type are known, for example, from aircraft construction and are normally provided at points of low material loading in order to save weight. In this case, it is conceivable for at least one weight-reducing cutout to be bordered or enclosed by a reinforcing flange, as a result of which, despite the reduction in weight achieved by the cutout, the required rigidity of the supporting device is maintained or can even be increased further.

It goes without saying that the features mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below, with the same reference numbers referring to the same or similar or functionally identical components.

Other features which are considered as characteristic for the invention are set forth in the appended claims.

Although the invention is illustrated and described herein as embodied in a supporting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
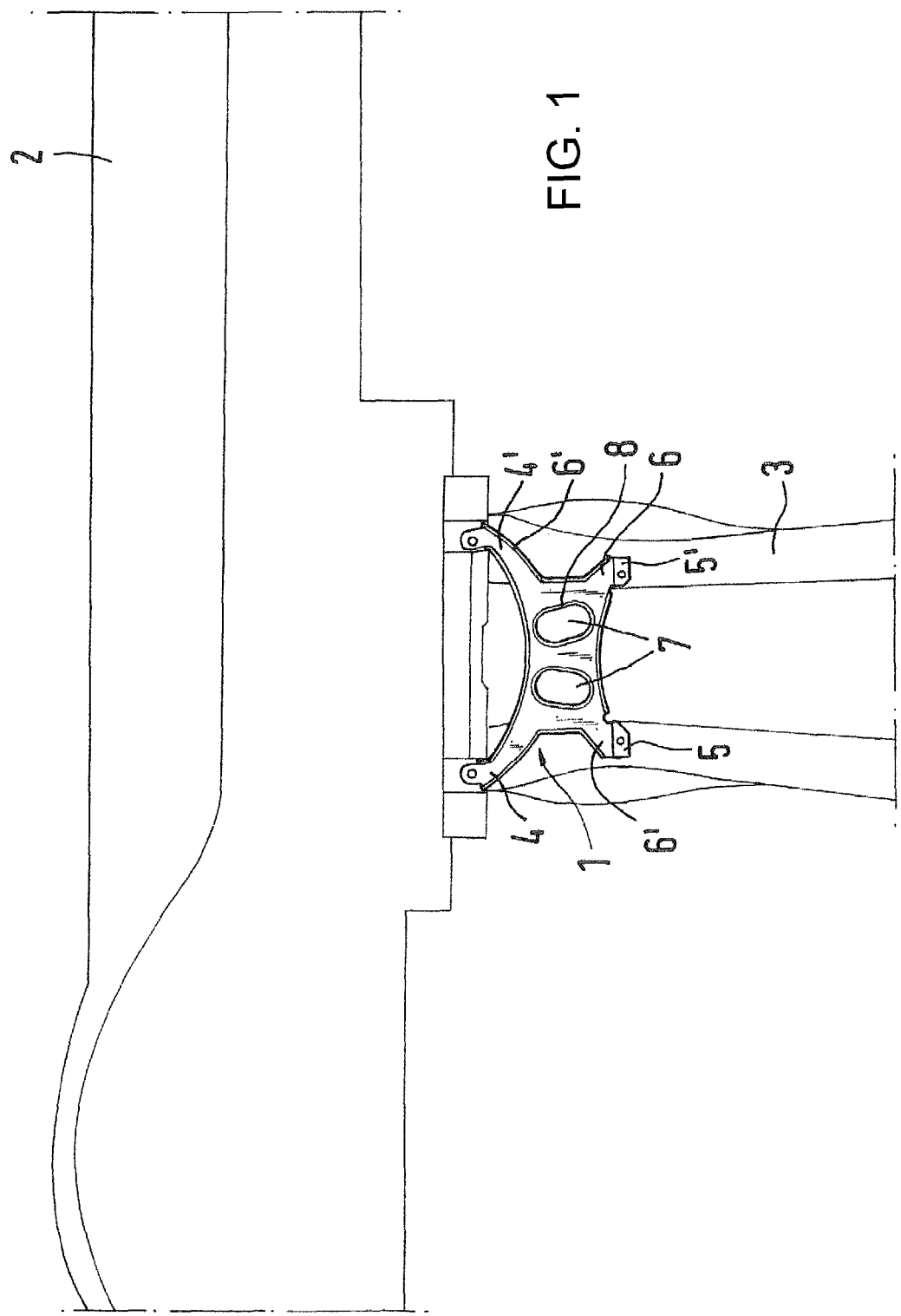
FIG. 1 is a diagrammatic, front view of a supporting device according to the invention.

Referring now to the figures of the drawing in detail and first, particularly, to FIG. 1 thereof, there is shown a supporting device 1 that has an X-shaped configuration according to the invention for supporting a cockpit 2, in particular a control panel or a dashboard, on a central tunnel 3. The X-shaped configuration is formed here by two arms 4 and 4' which carry the cockpit 2 and two legs 5 and 5' which are supported in relation to the central tunnel 3.

Figure 2:
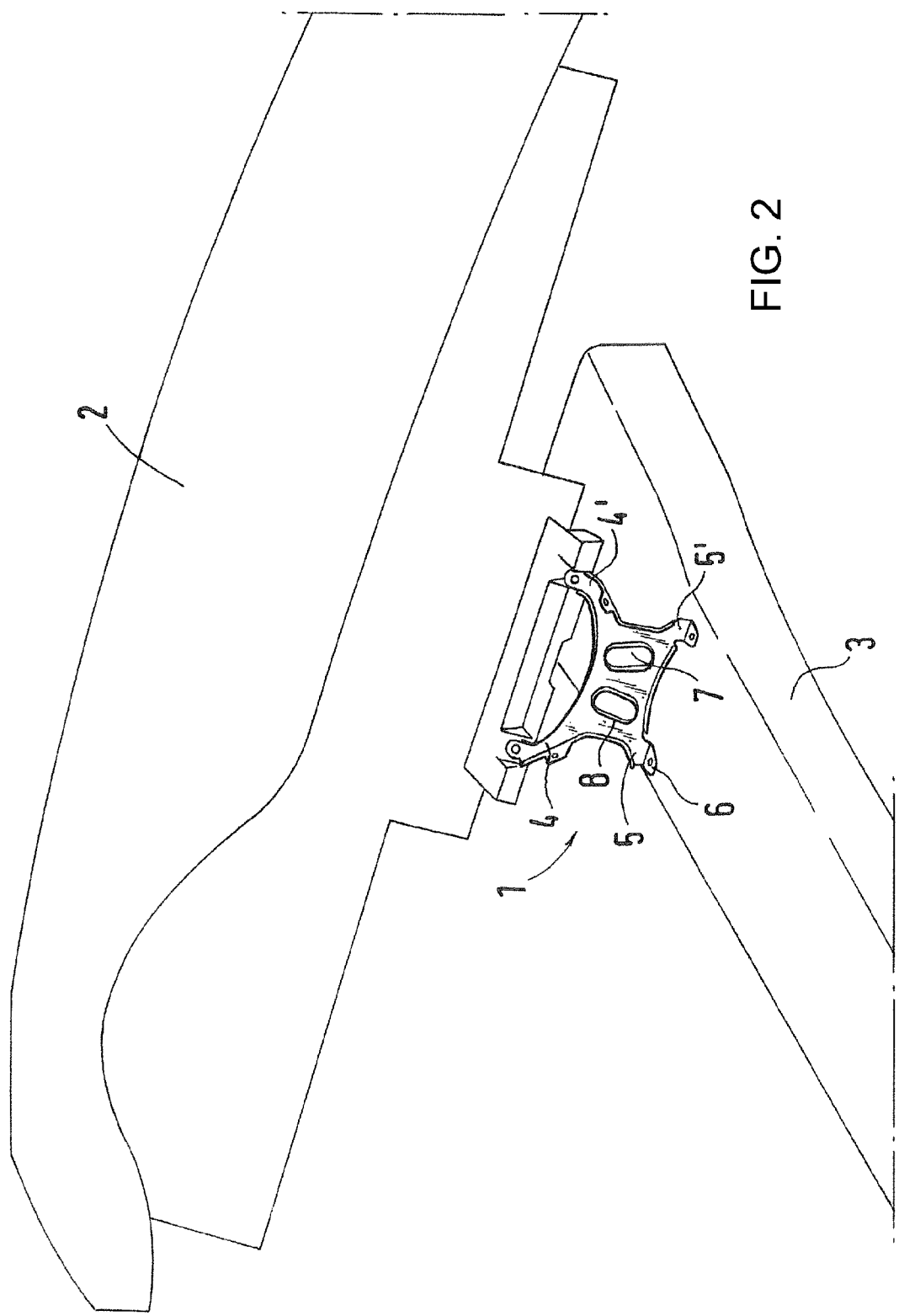
FIG. 2 is a diagrammatic, perspective view from the front of the supporting device according to the invention.
Figure 3:
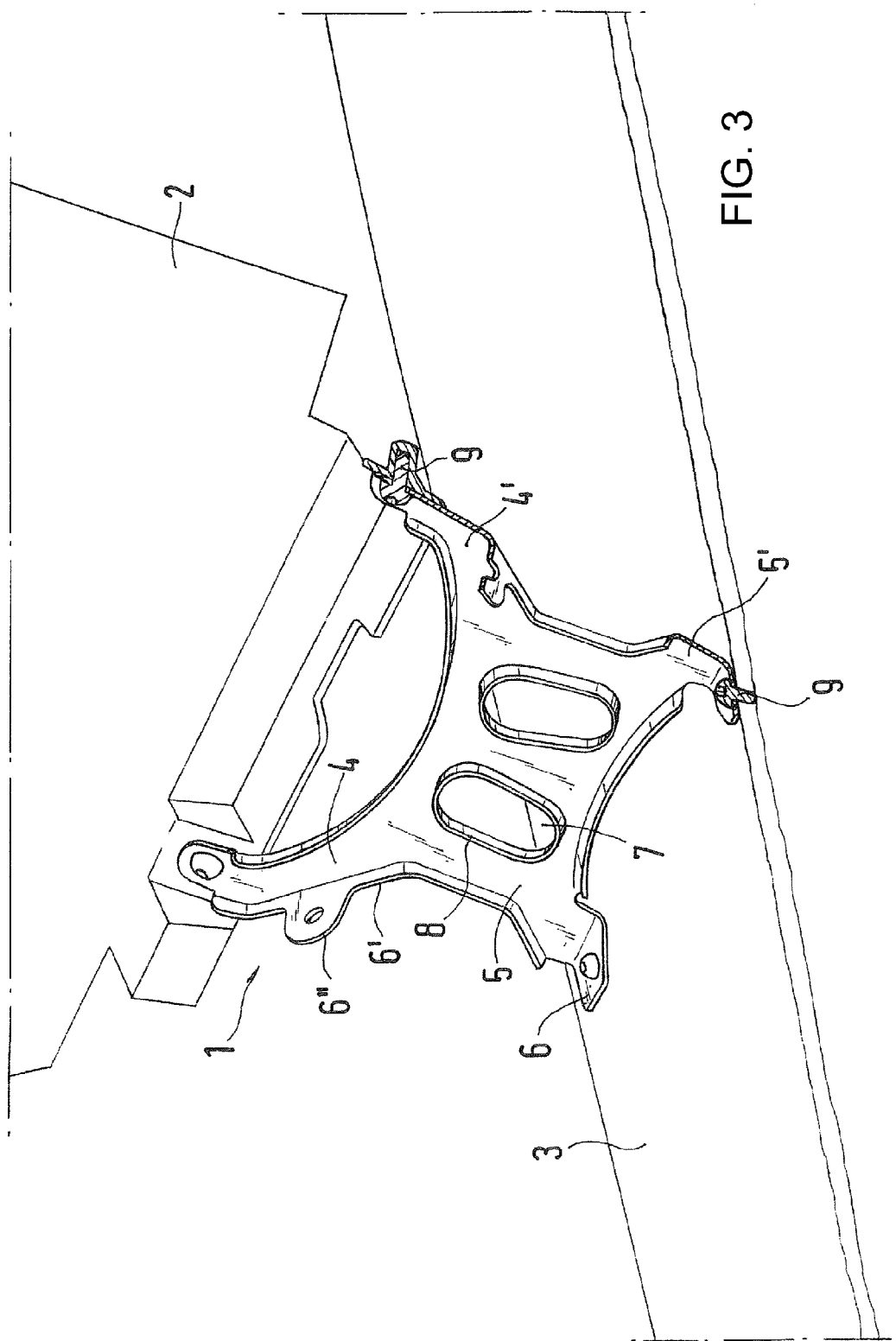
FIG. 3 is a partially sectioned view of the supporting device.

It is conceivable here for the supporting device 1, as shown, for example, in FIGS. 2 and 3, to be inclined forward slightly in a longitudinal direction of the vehicle and to be fixedly connected, in particular screwed, via its arms 4 and 4' to the cockpit 2 and via its legs 5 and 5' to the central tunnel 3. In order to facilitate the screwing, the supporting device 1 can have angled flanges 6, in particular angled bottom flanges 6. In the embodiments illustrated according to FIGS. 1 to 3, the arms 4 and 4' of the supporting device 1 are screwed substantially horizontally to the cockpit 2 while the legs 5 and 5' of the supporting device 1 are screwed substantially vertically to the central tunnel 3. One possible arrangement of screws 9 is shown in the sectional illustration according to FIG. 3.

In order to be able to achieve the greatest possible rigidity but, at the same time, the lowest possible weight, the supporting device 1 has flanges 6' extending at least at the edges of the arms 4, 4' and/or of the legs 5, 5'. Flanges 6' of this type can be produced in a cost-effective manner by a simple deforming process and define the rigidity of the supporting device 1 in accordance with their embodiment.

It is provided to form the supporting device 1 from metal, in particular from light metal, in order to keep the weight of the supporting device 1 as low as possible as a result, this being of great significance in particular in the manufacturing of sports vehicles. It is also conceivable for the supporting device 1 to be configured as a magnesium diecast part. In comparison to aluminum, the density of magnesium is only approximately ⅔ of the density of aluminum.

As can furthermore be gathered from FIGS. 1 to 3, the supporting device 1 illustrated in each case has a plurality of weight-reducing cutouts 7, as a result of which weight can additionally be saved. Weight-reducing cutouts 7 of this type are usually provided in those material regions of the supporting device 1 in which the material loading is low. To reinforce the supporting device 1 in the region of the weight-reducing cutouts 7, reinforcing flanges 8 which border the weight-reducing cutouts 7 can be provided.

As can be seen in particular in FIG. 3, in addition to the flanges 6, it is possible to provide further flanges 6" which serve to connect further non-illustrated components.

In comparison to conventional supporting devices, the supporting device 1 according to the invention has a filigree and, as a result, lightweight construction, thus enabling in particular the primary goal in the manufacturing of sports vehicles of reducing the weight to be achieved. At the same time, the required rigidity of the supporting device 1 can be achieved by correspondingly provided flanges 6' which are provided, for example, at the edges along the arms 4, 4' and/or the legs 5, 5'. In order, furthermore, to be able to additionally reduce weight, the weight-reducing cutouts 7 mentioned in the previous paragraph can be provided and the supporting device 1 can be formed from light metal. In general, the supporting device 1 according to the invention provides a cost-effective and low-weight solution for supporting the cockpit 2 in relation to the central tunnel 3. Furthermore, the supporting device 1 prevents the cockpit 2 from sagging.

The invention claimed is:

1. A supporting device for supporting a cockpit on a central tunnel of a motor vehicle, the supporting device comprising:
a supporting device body having an X-shaped configuration with two arms for carrying the cockpit and two legs supported on the central tunnel;
said supporting device body having at least one weight-reducing cutout formed therein.

2. The supporting device according to claim 1, wherein said supporting device body has flanges extending at least from edges of at least one of said arms and said legs.

3. The supporting device according to claim 1, wherein said supporting device body is fixedly connected, via said arms to the cockpit, and via said legs to the central tunnel.

4. The supporting device according to claim 1, wherein said supporting device body is formed from a material selected from the group consisting of plastics, metals, and light metals.

5. The supporting device according to claim 1, wherein said supporting device body has a reinforcing flange bordering said at least one weight-reducing cutout.

6. The supporting device according to claim 1, wherein said supporting device body is a magnesium diecast part.

7. The supporting device according to claim 2, wherein said flanges are angled bottom flanges by which said supporting device body stands on the central tunnel and are disposed at least on said legs.

8. The supporting device according to claim 1, wherein the cockpit is a control panel.

9. The supporting device according to claim 1, wherein said supporting device body is screwed via said arms to the cockpit and via said legs to the central tunnel.

10. A motor vehicle, comprising:
a central tunnel;
a cockpit; and
a supporting device for supporting said cockpit on said central tunnel, said supporting device having an X-shaped configuration with two arms for carrying said cockpit and two legs supported on said central tunnel;
said supporting device having at least one weight-reducing cutout formed therein.

11. The motor vehicle according to claim 10, wherein said supporting device has flanges extending at least from edges of at least one of said arms and said legs.

12. The motor vehicle according to claim 10, wherein said supporting device is fixedly connected, via said arms to the cockpit, and via said legs to the central tunnel.

13. The motor vehicle according to claim 10, wherein said supporting device is formed from a material selected from the group consisting of plastics, metals, and light metals.

14. The motor vehicle according to claim 10, wherein said supporting device has a reinforcing flange bordering said at least one weight-reducing cutout.

15. The motor vehicle according to claim 10, wherein said supporting device is a magnesium diecast part.

16. The motor vehicle according to claim 10, wherein:
said supporting device has flanges extending at least from edges of at least one of said arms and said legs; and
said flanges are angled bottom flanges by which said supporting device stands on the central tunnel and are disposed at least on said legs.

17. The motor vehicle according to claim 10, wherein the cockpit is a control panel.

18. The motor vehicle according to claim 10, wherein said supporting device is screwed via said arms to the cockpit and via said legs to the central tunnel.

* * * * *